Sept. 22, 1959 W. R. ARSENAULT ET AL 2,905,834

MAGNETIC GATING SYSTEM

Filed Feb. 7, 1955 2 Sheets-Sheet 1

WILLIAM R. ARSENAULT,
ALLEN E. GARFEIN,
RAGNAR THORENSEN,
INVENTORS

BY Ellsworth R. Roston

ATTORNEY

Sept. 22, 1959 W. R. ARSENAULT ET AL 2,905,834

MAGNETIC GATING SYSTEM

Filed Feb. 7, 1955 2 Sheets-Sheet 2

WILLIAM R. ARSENAULT,
ALLEN E. GARFEIN,
RAGNAR THORENSEN.
INVENTORS

BY

Ellsworth R. Roston

ATTORNEY

United States Patent Office 2,905,834

Patented Sept. 22, 1959

2,905,834

MAGNETIC GATING SYSTEM

William R. Arsenault, Santa Monica, Allen E. Garfein, Culver City, and Ragnar Thorensen, Los Angeles, Calif., assignors to The Magnavox Company, Los Angeles, Calif., a corporation of Delaware Application February 7, 1955, Serial No. 486,514

23 Claims. (Cl. 307—88)

This invention relates to flip-flops and more particularly, to a dynamic flip-flop which utilizes magnetic principles to produce signals having first characteristics in representation of a first value and signals having second characteristics in representation of a second value.

In recent years, considerable progress has been made in the field of digital computers. This progress has been so great that computers utilizing digital techniques have become practical for a wide variety of uses. In digital computation, numbers are represented by pluralities of signals each having a first amplitude to represent a value of "1" and a second amplitude to represent a value of "0." For example, a decimal number of "67" can be represented in binary form by a plurality of signals having a configuration of 1100001, where the least significant digit is at the left.

Although digital computers can be quite complex, they are built in general from a relatively small number of basic components connected in various electrical patterns in accordance with the operation desired of the computer. The flip-flop is perhaps the most basic of these components. This is so since the flip-flop operates on a bistable basis to produce at certain times signals representing values of "1" or a "true" state and at other times signals representing a value of "0" or a "false" state.

Until now, flip-flops have been produced largely from electrical components. These flip-flops have had certain disadvantages. For example, they have required a relatively large number of resistors and capacitors for proper operation. Furthermore, they have required the use of at least two vacuum tubes and generally four or six tubes if input stages to the flip-flop and output stages from the flip-flop are also included. As is well-known, vacuum tubes have characteristics which vary from tube to tube and during the life of the tube. The life of the vacuum tubes is also relatively short and their size is relatively great.

This invention provides a flip-flop which overcomes the above disadvantages by utilizing magnetic principles. The flip-flop includes a saturable magnetic core such as a toroidal core having a hole formed either axially or radially in the core for interrupting the magnetic continuity of the core. A first winding is disposed on the core at a position removed from the hole to produce a saturating flux in the core when signals representing a value of "0" are desired and to produce a reduced flux in the core when signals representing a value of "1" are desired.

A second winding is disposed on the core in threaded relationship to the hole interrupting the magnetic continuity of the core. The winding receives clock signals at periodic intervals and produces a transient flux in the core at such times as the flux of reduced intensity has been produced in the core by the first winding. A third winding is also disposed on the core in threaded relationship to the hole which interrupts the magnetic continuity of the core. This winding has electrical signals induced in it in accordance with the transient flux produced in the core by the clock signals in the second winding. In this way, signals are induced in the third winding by the transient flux to represent a value of "1" or a "true" state when the flux produced by the first winding is at a reduced level.

No signals are induced in the third winding by the clock signals when a saturating flux is produced by the first winding. The lack of production of any signals in the third winding at the time of the clock signals represents a value of "0" or a "false" state. No signals are induced in the third winding because of the inhibiting action provided by the saturating magnetic flux in preventing any further flux from being produced by the clock signals.

An object of this invention is to provide a dynamic flip-flop for producing signals of a first amplitude at particular times and for producing signals of a second amplitude at other times.

Another object is to provide a flip-flop of the above character which utilizes magnetic principles to obtain signals of the first and second amplitudes.

A further object is to provide a flip-flop of the above character having a saturable magnetic core in which the core becomes saturated for the production of signals representing a first value such as "0" and in which the saturation is removed for the production of signals representing a second value such as "1"

Still another object is to provide a flip-flop of the above character in which the core is modified as by a radial or axial hole such that a saturating or non-saturating flux can be permanently retained in the core to control the production of successive signals representing such values as "1" or successive signals representing such values as "0".

A still further object is to provide a magnetic flip-flop which is inexpensive, compact, simple in construction, reliable in operation and long-lived.

Another object is to provide apparatus for controlling the operation of a pair of gate circuits, one of which passes signals representing values such as "1" and the other of which passes signals representing values such as "0"

Other objects and advantages will be apparent from a detailed description of the invention and from the appended drawings and claims.

Figure 1:
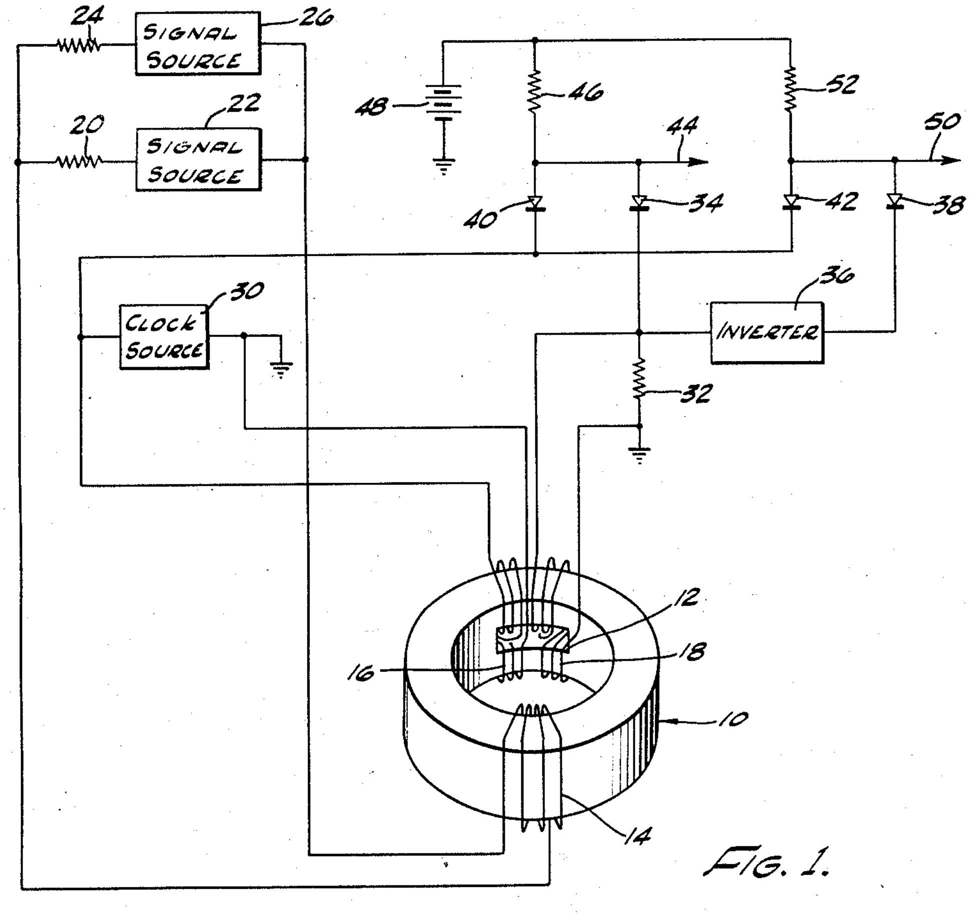
Figure 1 is a view, partly in perspective and partly in block form, of a flip-flop constituting one embodiment of this invention.
Figure 2:
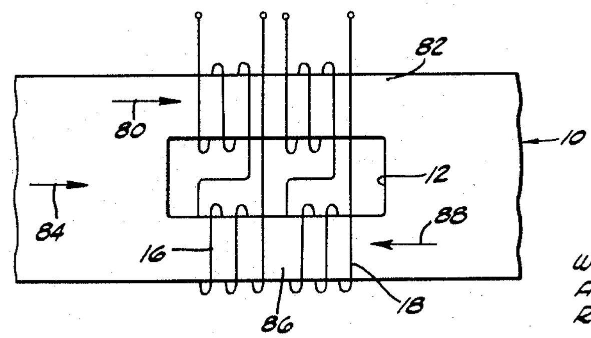
Figure 2 is an enlarged fragmentary front elevational view of a magnetic member forming an important component in the flip-flop shown in Figure 1 and illustrates in further detail the operation of the magnetic member.

In the embodiment of the invention shown in Figures 1 and 2, a flip-flop is provided having a memory member which includes a magnetic core 10. The core 10 may be a toroidal core made from a suitable material having saturable magnetic properties. For example, the core 10 may be made from a ferrite material designated as S1, S2, or S3 by General Ceramic and Steatite Corporation of Keasbey, New Jersey. This material is a ferromagnetic ceramic molded from powdered particles.

The outer and inner diameters of the toroidal core 10 may be approximately 0.37 inch and 0.18 inch, respectively, and the thickness of the core may be approximately 0.12 inch. A hole 12 having a suitable height such as approximately 0.04 inch is provided in the core 10 in a direction having a substantial radial component. In an axial direction, the center of the hole 12 may be equally spaced from the upper and lower extremities of the core as seen in Figures 1 and 2. The hole 12 may be circular or it may be elongated to a suitable length such as 0.10 inch such as is shown in Figures 1 and 2. It should be appreciated, however, that the dimensions described above are given for purposes of illustration only.

A first current conductor is disposed in magnetic proximity to the core 10 at a position removed from the hole 12. For example, a winding 14 having one or more turns is suitably disposed on the core 10 at a position removed from the hole 12. The winding 14 is provided with a sufficient number of ampere-turns to saturate the core with magnetic flux.

A second current conductor is disposed in magnetic proximity to the core and in threading relationship to the hole 12. This conductor may be a winding 16 formed from one or more turns. When more than one turn is provided in the winding 16, half of the turns preferably extend through the hole 12 and loop over the upper extremity of the core as seen in Figures 1 and 2, and the other half extend through the hole 12 and loop around the lower leg of the core. The winding 16 is shown in Figures 1 and 2 as having a plurality of turns disposed in a symmetrical relationship to the upper and lower extremities of the core.

In addition to the winding 16, another current conductor is disposed in threading relationship to the core 10. This curent conductor may be a winding 18 formed from one or more turns, all of which extend through the hole 12. When the winding 18 has more than one turn, the turns are preferably disposed in a symmetrical arrangement such that half loop the upper extremity of the core and the other half loop the lower extremity of the core. The winding 18 is shown in Figures 1 and 2 as having such a symmetrical relationship.

The memory member formed by the core 10 and the windings 14, 16 and 18 is included in the circuit shown in Figure 1. The winding 14 is connected in series with a resistance 20 and a signal source 22, and in series with a resistance 24 and a signal source 26. The sources 22 and 26 may be included in a digital computer or data processing apparatus and are adapted to provide particular voltages at certain intervals in accordance with the operation of the computer. During its periods of activation, the source 22 is adapted to provide a positive voltage of sufficiently high intensity to saturate the core 10, as will be disclosed in detail hereinafter. The source 26 is adapted during its periods of activation to provide a voltage for reducing to a nonsaturable level the magnetic flux produced in the core 10 by the signal source 22.

The winding 16 is connected to a source 30 of clock signals, one terminal of the source preferably being grounded. The source 30 may be a relaxation oscillator adapted to provide signals at a particular frequency. The clock signals may also be produced internally at periodic intervals in the computer or data processing apparatus such as from the rotation of a magnetic drum.

The winding 18 may be connected across a suitable resistance 32, one terminal of which is grounded. The signals on the ungrounded terminal of the resistance 32 are introduced to the cathode of a unidirectional member such as a diode 34 and through an inverter 36 to the cathode of a unidirectional member such as a diode 38. The inverter 36 may be a conventional amplifier stage which receives signals of one amplitude and inverts these signals into corresponding signals of a second amplitude. For example, a signal of low amplitude may be converted by the stage 36 into a signal of large amplitude and vice versa.

Unidirectional members such as diodes 40 and 42 are respectively associated in "and" networks with the diodes 34 and 38. The cathodes of the diodes 40 and 42 are connected to the ungrounded output terminal of the clock source 30. The plates of the diodes 34 and 40 have a common terminal with an output line 44. A resistance 46 is connected at one end to the plates of the diodes 34 and 40 and is in series with a suitable source of direct voltage such as a battery 48 having its negative terminal grounded. The diodes 34 and 40 and the resistance 46 are included in a first logical network. Similarly, connections are made from the plates of the diodes 38 and 42 to an output line 50 and to a resistance 52 in series with the battery 48. The diodes 38 and 42 and the resistance 52 are included in a second logical network.

Figure 3:
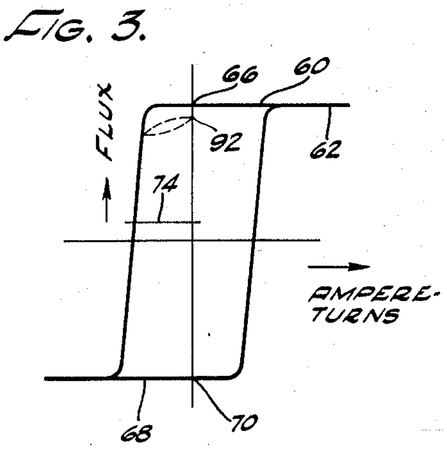
Figure 3 is a curve illustrating certain magnetic characteristics of the magnetic member shown in the previous figures.

Because of the particular material from which the core 10 is made, the core has substantially a rectangular hysteresis loop similar to that shown in Figure 3. In the curve shown in Figure 3, the ampere-turns applied to the core are represented along the horizontal axis and the flux produced in the core by the ampere-turns is represented along the vertical axis. The ampere-turns for producing flux in the core 10 are applied to the winding 14.

As indicated at 60 in Figure 3, the core 10 becomes saturated with magnetic flux of a positive polarity when a sufficient number of positive ampere-turns are applied to the winding 14. When the core 10 becomes saturated, increases in the ampere-turns applied to the winding 14 produce no appreciable increase in the flux traveling through the core. This is indicated at 62 in Figure 3. Upon the interruption of the current flowing through the winding 14, a residual flux remains in the core 10. This residual flux is of a sufficient intensity to saturate the core 10 as indicated by a position 66 corresponding to a zero value of ampere-turns in the winding 14.

In like manner, the core 10 becomes saturated with a flux of negative polarity as indicated at 68 when a sufficient amount of ampere-turns of negative polarity are applied to the winding 14. Substantially all of the flux remains in the core 10 as residual flux upon an interruption in the flow of current through the winding 14. The residual flux of negative polarity is indicated at 70 in Figure 3.

The residual flux remaining in the core after the interruption of the flow of current through one of the windings such as the winding 14 is utilized to obtain the action of a flip-flop. For example, a relatively large current may be initially applied to the winding 14 to produce a flux having the saturating intensity indicated at 60 in Figure 3. When the current through the winding 14 is removed, the magnetic flux in the core 10 remains at substantially the intensity 66.

Upon the introduction of a clock signal from the clock source 30 to the winding 16, current flows through the winding. This current has a positive polarity and ordinarily would produce a magnetic flux in the core. However, since a flux having the saturating intensity 66 already exists in the core 10, very little flux can be produced in the core 10 by the current flowing through the winding 16. In this way, the flux produced by the winding 14 acts as an inhibiting agent to prevent any appreciable amount of flux from being produced by the current through the winding 16. Because of the failure to produce any appreciable amount of flux, no electrical signal is induced in the winding 18 or at the most only a signal of relatively low intensity is induced in the winding.

Figure 4:
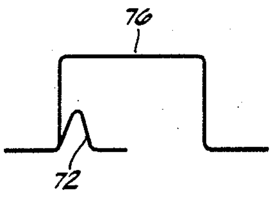
Figure 4 is an enlarged curve illustrating the operation of the flip-flop shown in Figures 1 and 2 to produce signals of first and second amplitudes.

In Figure 4, a signal 72 of relatively low amplitude is shown as being induced in the winding 18.

When a signal of low amplitude is induced in the winding 18, it causes a relatively small current to flow through the resistance 32 and a voltage of relatively low amplitude to be produced across the resistance. This low voltage is inverted in amplitude by the inverter 36 so that a voltage of large amplitude and of the same polarity is produced on the output terminal of the inverter. The high voltage is produced at substantially the same time as the positive clock signal from the source 30 and is introduced to the cathode of the diode 38. Since the positive clock signal is simultaneously introduced to the cathode of the diode 42, the high voltages on the cathodes of the diodes 38 and 42 prevent any current from flowing through a circuit including the battery 48, the resistance 52 and the diodes. The lack of any current flow through the resistance 52 prevents any voltage drop from being produced across the resistance. This causes the voltage on the output line 50 to be substantially equal to the voltage on the positive terminal of the battery 48.

The high voltage produced on the line 50 continues until the end of the clock signal from the source 30. At the end of the clock signal, the voltage on the cathode of the diode 42 drops to a relatively low value. This causes current to flow through a circuit including the battery 48, the resistance 52 and the diode 42 such that a voltage drop is produced across the resistance. This voltage drop causes a negative signal representing a value of "0" or a "false" state to be produced on the line 50.

Since the signal 72 has a positive amplitude, it causes the voltage on the plates of the diodes 34 and 40 to rise a corresponding amount at the time that a clock signal is introduced to the cathode of the diode 40. For this reason, a signal having an amplitude corresponding to that of the signal 72 is produced on the output line 44. The amplitude of the signal produced on the output line 44 is considerably less than the amplitude of the signal produced on the output line 50. Because of the considerable difference in amplitudes between the signals on the lines 44 and 50, the signal on the line 44 can be easily eliminated by conventional clamping techniques. In this way, the signal on the line 44 can be considered as being equivalent to no signal.

At particular times, the source 26 may become activated. When activated, the source 26 may produce a flow of current through the winding 14 of a polarity and intensity to reduce the flux in the core 10 from the saturating level 60 to a nonsaturated level such as that indicated at 74 in Figure 3. The level 74 is shown only by way of illustration since it will be appreciated that the flux may have either a positive or a negative polarity provided that it has a relatively low intensity.

Upon the production of the next clock signal by the source 30, current flows through the winding 16. Since the flux in the core 10 has a relatively low intensity, the current flowing through the winding 16 is able to produce additional flux in the core. Because of the proximity of the winding 18 to the winding 16, the flux produced by the winding 16 threads the winding 18 and causes a voltage to be induced in the winding 18. By making the current through the winding 16 sufficiently large, a relatively large voltage can be induced in the winding 18. The voltage induced in the winding 18 is indicated at 76 in Figure 4. As will be seen, both the amplitude and duration of the signal 76 are greater than those of the signal 72.

Because of the large amplitude of the signal 76, a relatively large current flows through the resistance 32 and causes a voltage of high amplitude to be produced across the resistance. This voltage is introduced to the cathode of the diode 34 at the same time that the positive clock signal from the source 30 is introduced to the cathode of the diode 40. The simultaneous introduction of positive voltages to the cathodes of the diodes 34 and 40 prevents current from flowing through a circuit including the battery 48, the resistance 46 and the diodes. Since no voltage drop is produced across the resistance 46, a high voltage is produced on the output line 44.

The high voltage on the line 44 continues until the end of the clock signal from the source 30. At the end of the clock signal, the voltage on the cathode of the diode 40 becomes low and causes current to flow through a circuit including the battery 48, the resistance 46 and the diode 40. This current produces a voltage drop across the resistance 46 such that a negative signal is produced on the output line 44. This negative signal represents a value of "1" or a "true" state.

The signal 76 is also introduced to the inverter 36, which operates to convert the signal into a signal of positive polarity and of relatively low amplitude. This voltage limits the amplitude of the signals which can be produced on the output line 50 such that signals of low amplitude are produced on the line 50 in comparison to the amplitude of the signals produced on the line 44. Since the signals of low amplitude on the line 50 can be eliminated by conventional clamping techniques, the signals on the line 50 can be considered as equivalent to no signals.

In previous core structures, the flux in the core would become saturated upon the introduction of a clock signal to the winding 16 even though the flux in the core was previously not saturated. For example, with the flux at a level corresponding to the level 74, the introduction of a clock signal to an input winding corresponding to the winding 16 would cause the flux in the core to approach a saturating level corresponding to the level 60. The flux would remain at this saturating level even after the end of the clock signal. Since the level of the flux would have been permanently and considerably changed after the occurrence of just one clock signal, the core structures now in use could not be included with other components to form a dynamic flip-flop. The reason is that the flux level in the core may be desired to be retained for a plurality of clock signals so that a sequence of signals all representing a value "1" or all representing a value of "0" can be produced.

In the embodiment shown in Figures 1 and 2, the flux level produced in the core by the current flowing through the winding 14 is retained in the core even after the introduction of clock signals to the winding 16. For example, flux having the intensity 74 in Figure 3 may be initially produced in the core 10 by current flowing through the winding 14. Since the flux is in the unsaturated region of the hysteresis curve shown in Figure 3, only a slight current in one of the windings is required to produce a considerable change of flux in the core 10. This current is produced in the winding 16.

Since the winding 16 is disposed in contiguous relationship to the hole 12, the flux produced by current flowing through the winding tends to loop the hole. As indicated by an arrow 80 in Figure 2, the flux extends in one direction through a leg 82 defined by the hole 12 and the top periphery of the core 10. This direction corresponds to the direction of the magnetic flux produced in the core 10 by the current through the winding 14, this flux being indicated by an arrow 84 in Figure 2. However, the flux produced by the current through the winding 16 extends in an opposite direction through a leg 86 defined by the hole 12 and the bottom periphery of the core 10. The flux produced in the leg 86 by the current in the winding 16 is indicated by an arrow 88 in Figure 2. Since the flux 84 has to flow through the legs 82 and 86 because of the partial interruption in the continuity of the core as represented by the hole 12, the flux 84 can be considered as being divided in the legs 82 and 86.

Because of the unsaturated intensity of the residual flux 84 in the core, additional flux is able to flow through the leg 82 without producing a saturating flux in the leg.

This causes the flux 80 in the leg 82 to be substantially equal in intensity but opposite in polarity to the flux 88 in the leg 86. Since the fluxes are of opposite polarities, the fluxes tend to cancel in the area displaced from the hole 12. In this way, a residual flux having an intensity corresponding to the intensity 74 remains in the core after the current in the winding 14 has been interrupted. This causes the core 10 to be in condition for inducing another signal representing a value "1" upon the introduction of the next clock signal. In this way, sequences of signals representing values of "1" can be induced in the winding 18 after the core 10 has been initially set to the proper magnetic level by the current flowing through the winding 14.

When a relatively large current is passed through the winding 14, a saturating flux having an intensity 60 in Figure 3 is produced. This flux continues at a saturating level 66 even after the current in the winding 14 has been interrupted. The polarity of this flux is indicated at 84 in Figure 2. Upon the subsequent introduction of a clock signal to the winding 16, current flows through the winding. Since the flux 84 passing through the leg 82 is already of a saturating intensity, the flux 80 produced in the leg 82 by the current through the winding 16 is able to produce little effect on the flux 84. However, the flux 88 produced on the lower leg 86 by the current in the winding 16 is capable of altering the magnitude of the flux 84 considerably since it opposes the flux 84.

In order to alter the main flux 84 throughout the entire core 10, the magnetic flux produced by the winding 16 must overcome the coercive force of the entire core. Since the coercive force of the core 10 can be made large, the flip-flop described above can be operated with an optimum current through the winding 16. This current is sufficiently small in amplitude so as not to alter materially the magnitude of the main flux 84 in the toroid. However, the current is large enough to produce a considerable signal in the winding 18 when the core 10 is in a neutral state represented by 74 in Figure 3.

It can be shown that the flux 88 has a greater effect on the main flux 84 than the flux 80 when the main flux in the core 10 has a saturable intensity. In spite of this, there is a tendency for the fluxes 80 and 88 to effectively cancel each other, at least in the portion of the core removed from the hole 12. Because of this effective cancellation, the current through the winding can be of a considerable amplitude without materially altering the main flux in the core. This is true even when the main flux has a saturable intensity such as that indicated at 66 in Figure 2.

For the reasons described in the previous paragraph, the residual flux in the core 10 may decrease only from the saturating level 66 in Figure 3 to a level 92 relatively close to saturation when successive clock signals are introduced to the winding 16. Since the level 92 is relatively close to the level 66, any signals induced in the winding 18 still have a low intensity as compared to the signals induced in the winding 18 when the residual flux has a level 74. Because of this, the flux level 92 still causes signals representing a value of "0" or a "false" state to be induced in the winding 18 upon the introduction of successive clock signals to the winding 16.

Figure 5:
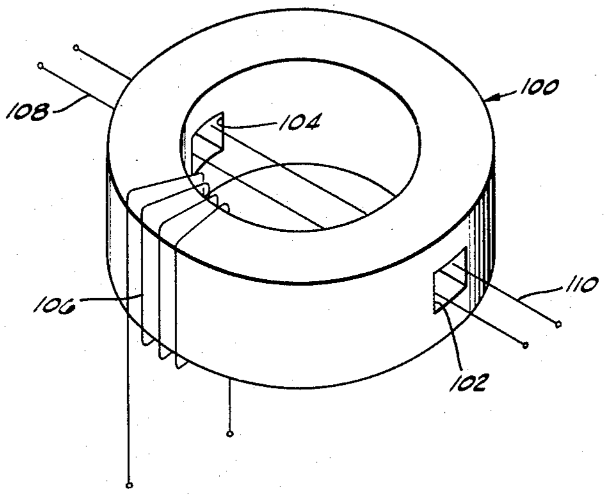
Figure 5 is a perspective view of another magnetic member which can be included in the flip-flop shown in Figure 1.
Figure 6:
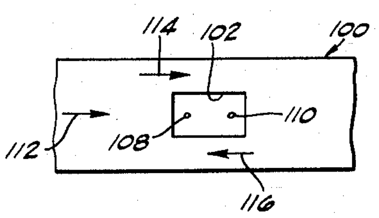
Figure 6 is a side elevational view of the magnetic member shown in Figure 5 and illustrates in further detail the operation of the member.

In the embodiment shown in Figures 5 and 6, radial holes are provided in a core 100 corresponding to the core 10. For example, a first hole 102 and a second hole 104 are shown as being provided in the core 100 in diametrical relationship to each other. However, it should be appreciated that the holes 102 and 104 need not be in diametrical relationship and that one radial hole or a plurality of radial holes may be provided.

A winding 106 corresponding to the winding 14 in Figures 1 and 2 may be disposed on the core 100 at a position intermediate the holes 102 and 104. A current conductor 108 threads the holes 102 and 104 to perform functions similar to the winding 16 in Figures 1 and 2.

As shown in Figures 5 and 6, the conductor 108 extends through the holes 102 and 104 without looping around the legs formed by the holes. However, it should be appreciated that the conductor 108 can be made to loop by one or more turns the legs defined by the holes 102 and 104. Similarly, a current conductor 110 threads the holes 102 and 104 to perform functions corresponding to the winding 18 in Figures 1 and 2.

Flux having a particular level to represent magnetic information is stored in the core 100 upon a flow of current through the winding 106. This magnetic information is produced in a manner similar to that disclosed above and is indicated by an arrow 112 in Figure 6. When a clock signal is subsequently introduced to the conductor 108, it causes current to flow through the conductor. This current acts to produce a localized magnetic field around the holes 102 and 104. The magnetic field in one of the legs defined by each of the holes 102 and 104 is in the same direction as the flux 112 as indicated by an arrow 114 in Figure 6. The magnetic field in the other leg defined by each of the holes 102 and 104 is in an opposite direction to the flux 112, as indicated by an arrow 116 in Figure 6.

As will be seen, the magnetic fields 114 and 116 produced around the radial holes in Figures 5 and 6 respectively correspond in direction to the magnetic fields 80 and 88 produced around the axial hole in Figures 1 and 2. For this reason, the memory member shown in Figures 5 and 6 acts in a manner similar to that described above for the memory member shown in Figures 1 and 2. In this way, the memory member shown in Figures 5 and 6 can be substituted in the circuit shown in Figure 1 for the memory member forming a part of the circuit.

The dynamic flip-flop disclosed above has several important advantages. It utilizes magnetic techniques to obtain the characteristics of a flip-flop and thereby avoids any necessity for using vacuum tubes. As previously disclosed, vacuum tubes have certain disadvantages resulting from unstable characteristics with time, relatively short life and large size. By using magnetic techniques, a small, compact and stable flip-flop is obtained in which the characteristics of the flip-flop remain stable over long periods of time. The dynamic flip-flop constituting this invention also avoids the necessity of using the large number of resistances and capacitances required in the flip-flops now in use.

The dynamic flip-flop disclosed above includes a magnetic memory member having indestructible memory characteristics. In this way, magnetic information can be inserted into the member and can be retained within the member even while the information is being utilized to produce signals representing such values as "0" or "1." Because of its indestructible memory, the flip-flop is able to produce sequences of signals all representing the same value upon the introduction of successive clock signals and without requiring any reinsertion of information into the flip-flop after each clock signal.

The above advantages are obtained merely by providing a hole in the core and by threading a pair of conductors through the core. The core can be purchased as a standard item and the hole can be easily produced in the core without requiring that the core is subsequently heat treated. Since the necessary windings can be easily disposed in magnetic proximity to the core, a relatively simple and inexpensive memory member is obtained.

It should be appreciated that a plurality of holes as well as one or two holes can be provided in the magnetic core such as the core 10 in Figures 1 and 2. The holes may be either radial holes as shown in the drawings or they may be axial holes. As described in co-pending application Serial No. 473,664, filed by William R. Arsenault et al. on December 7, 1954, and now abandoned, axial holes have the same effect as radial holes from the standpoint of a non-destructive memory member. It should also be appreciated that the circuit shown in Figure 1 can be modified in various ways. For example, different types of "and" networks than that formed by the resistance 46 and the diodes 34 and 40 can be used. Furthermore, the sources 22 and 26 can be electrically arranged in a different manner relative to each other and to the magnetic memory member than that shown in the drawings.

It is also possible that the windings such as the windings 14, 16 and 18 can be arranged on the core such as the core 10 in a different manner than that shown in the drawings and described above. For example, it is possible that the functions of the windings 14 and 16 can be substituted for each other. There may be several independent arrangements such as that associated with the hole 12 (Figures 1 and 2) on a single core. There may also be several control windings such as the winding 14 (Figure 1) which perform the same function as the winding 14 but which are controlled by different sources corresponding to the sources 22 and 26.

The apparatus constituting this invention has been described for use in a dynamic flip-flop. However, the apparatus can be used to control the passage of signals through a plurality of gate circuits such as the gate circuits shown in Figure 1.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination, a saturable core having properties of flux remanence, first means magnetically coupled to the core for producing transient magnetic flux in the core upon the occurrence of clock signals, second means magnetically coupled to the core for the induction of signals greater than a particular amplitude in accordance with the transient magnetic flux produced in the core by the clock signals, third means magnetically coupled to the core for providing magnetic flux of a first intensity in the core to obtain the production of transient magnetic flux in the core upon the occurrence of the clock signals and for providing magnetic flux of a second intensity in the core to inhibit the production of transient magnetic flux in the core upon the occurrence of the clock signals, means including a first pair of unidirectional conducting members coupled electrically to the first and second magnetically coupled means for the production of first output signals upon the induction of signals greater than the particular amplitude in the second magnetically coupled means and the simultaneous occurrence of clock signals, and means including a second pair of unidirectional conducting members coupled electrically to the first and second magnetically coupled means for the production of second output signals upon the induction of signals less than the particular amplitude in the second magnetically coupled means and the simultaneous occurrence of clock signals.

2. In combination, a saturable core, capable of retaining flux introduced to the core, first means magnetically coupled to the core for producing magnetic flux of a saturating intensity in the core at particular times and for producing magnetic flux of relatively low intensity in the core at other times, second means magnetically coupled to the core for producing a sequence of clock signals, third means magnetically coupled to the core for producing signals greater than a particular amplitude, only upon the occurrence of clock signals during periods of relatively low flux intensity in the core, first output circuitry coupled electrically to the third magnetically coupled means and responsive to the clock signals to produce first output signals upon the occurrence of signals greater than the particular amplitude from the third magnetically coupled means at the same time as the occurrence of the clock signals, and second output circuitry coupled electrically to the third magnetically coupled means and responsive to the clock signals to produce second output signals upon the occurrence of signals less than the particular amplitude from the third magnetically coupled means at the time of occurrence of the clock signals.

3. In combination, means for providing a plurality of clock signals, a magnetic core having saturable properties and having properties of flux remanence, at least a first current conductor magnetically coupled to the core for producing magnetic flux in the core in accordance with the occurrence of the clock signals, at least a second current conductor magnetically coupled to the core for the induction of signals in accordance with the changes in magnetic flux produced by the first current conductor upon the occurrence of the clock signals, at least a third current conductor magnetically coupled to the core for producing magnetic flux of a first intensity in the core to inhibit the induction of signals in the second conductor and for producing magnetic flux of a second intensity in the core to provide for the induction of signals in the second conductor, means including first unidirectional conducting means coupled electrically to the second current conductor and to the clock signal means for the production of first output signals upon the simultaneous induction of signals in the second conductor and the production of clock signals by the clock signal means, and means including second unidirectional conducting means coupled electrically to the second current conductor and to the clock signal means for the production of second output signals by the clock signal means and the simultaneous inhibition in the induction of signals in the second conductor.

4. In combination, a saturable magnetic bore having properties of flux remanence, first means magnetically coupled to the core for receiving a sequence of clock signals and for producing a transient magnetic flux in the core upon the occurrence of the clock signals, second means magnetically coupled to the core for the induction of signals greater than a particular amplitude upon the production of the transient magnetic flux, means magnetically coupled to the core to produce a magnetic flux of saturating intensity in the core for inhibiting the induction of the signals and to produce a magnetic flux of a reduced intensity in the core for obtaining the induction of the signals, means including a first logical network coupled electrically to the second magnetically coupled means and responsive to the clock signals to produce first output signals upon the production of signals greater than the particular amplitude by the second magnetically coupled means at the time of introduction of the clock signals to the first magnetically coupled means, and means including a second logical network coupled electrically to the second magnetically coupled means and responsive to the clock signals to produce second output signals upon a lack of production of signals greater than the particular amplitude by the second magnetically coupled means at the time of introduction of the clock signals to the first magnetically coupled means.

5. In combination, a saturable magnetic core having properties of flux remanence, first means magnetically coupled to the core for producing a magnetic flux of saturating intensity in the core at particular times and for producing a magnetic flux of reduced intensity in the core at other times, second means magnetically coupled to the core for producing signals greater than a particular amplitude in accordance with transient changes in flux in the core, third means magnetically coupled to the core for periodically receiving clock signals and for correspondingly producing transient changes in the magnetic flux in the core without disturbing the magnitude of the flux in the core after the transient changes, to obtain signals greater than a particular amplitude from the second magnetically coupled means only during the times of reduced flux intensity in the core, means including a first logical network having a pair of diodes responsive to the clock signals and to the signals produced by the second magnetically coupled means for producing first output signals upon the simultaneous occurrence of the clock signals and signals greater than the particular amplitude from the second magnetically coupled means, and means including a second logical network having a pair of diodes and an amplitude inverter and responsive to the clock signals and to the signals produced by the second magnetically coupled means for producing second output signals upon the simultaneous occurrence of the clock signals and signals less than the particular amplitude from the second magnetically coupled means.

6. In combination, a saturable magnetic core capable of retaining flux in the core, there being at least one hole in the core for interrupting the magnetic continuity of the core, at least a first current conductor magnetically coupled to the core to produce a saturating magnetic flux in the core at particular times and to produce a reduced flux intensity in the core at other times, at least a second current conductor threading the hole in the core to produce transient magnetic flux in the core upon the introduction of clock signals and in accordance with the flux produced in the core by the first current conductor, at least a third current conductor threading the hole in the core for the induction of signals in the winding upon the production of transient flux by the second winding, means responsive to the clock signals and to the signals induced in the third winding to produce first output signals during the occurrence of magnetic flux of reduced intensity in the core at the time of introduction of the clock signals, and means responsive to the clock signals and to the signals induced in the third winding to produce second output signals during the occurrence of saturable flux in the core at the time of introduction of the clock signals.

7. In combination, a saturable magnetic core having properties of flux remanence, at least a first current conductor magnetically coupled to the core to produce transient magnetic fluxes in the core upon the introduction of clock signals, at least a second current conductor magnetically coupled to the core for the induction of signals upon the formation of transient fluxes in the core, at least a third current conductor magnetically coupled to the core for producing a first level of residual magnetic flux in the core to provide for the formation of transient fluxes in the core and for producing a second level of residual magnetic flux in the core to inhibit the formation of transient fluxes in the core, means in the core for preventing the residual magnetic flux in the core from being permanently disturbed upon the introduction of the clock signals, a first logical network operatively coupled to the second current conductor and responsive to the clock signals for the production of output signals from the network upon the formation of transient fluxes in the core at the time of introduction of the clock signals, and a second logical network operatively coupled to the second current conductor and responsive to the clock signals for the production of output signals from the network upon the inhibition in the formation of transient fluxes in the core at the time of introduction of clock signals.

8. Apparatus as set forth in claim 7, in which the means for preventing the residual magnetic flux in the core from being permanently disturbed upon the introduction of the clock signals includes a hole extending through the core to interrupt the uniformity of the flux travel path in the core without completely interrupting the flux travel path and in which at least the first current conductor extends through the hole in the core to produce transient magnetic fluxes in the core.

9. In combination, a saturable magnetic core having characteristics of flux remanence, there being at least one hole in the core for interrupting the magnetic continuity of the core, at least a first current conductor magnetically coupled to the core to produce a saturating magnetic flux in the core at particular times and to produce a reduced flux intensity in the core at other times, at least a second current conductor threading the hole in the core to produce transient magnetic flux in the core upon the introduction of clock signals and during the production of a reduced flux intensity in the core by the first current conductor, at least a third current conductor threading the hole in the core for the induction of signals greater than a particular amplitude in the winding upon the production of transient flux by the second winding, means including first diodes operatively controlled by the clock signals and the signals induced in the third conductor for producing signals upon the simultaneous occurrence of clock signals and signals greater than a particular amplitude in the third conductor, and means including second diodes operatively controlled by the clock signals and the third conductor for producing signals upon the occurrence of clock signals without the simultaneous induction in the third conductor of signals greater than the particular amplitude.

10. In combination, a saturable core having properties of flux remanence, first means magnetically coupled to the core for producing magnetic flux in the core upon the occurrence of clock signals, second means magnetically coupled to the core for the induction of signals greater than a particular amplitude in accordance with the transient magnetic flux produced in the core by the clock signals, means for providing magnetic flux of a first intensity in the core to obtain the production of transient magnetic flux in the core upon the occurrence of the clock signals and for providing magnetic flux of a second intensity in the core to inhibit the production of transient magnetic flux in the core upon the occurrence of the clock signals, a first circuit operatively controlled by the clock signals and responsive to the induced signals for producing first output signals upon the induction of signals greater than the particular amplitude in the second magnetic means at the same time as the occurrence of clock signals, and a second circuit operatively controlled by the clock signals and responsive to the induced signals for producing second output signals upon the occurrence of clock signals without an induction of signals greater than the particular amplitude in the second magnetic means at the same time.

11. In combination, a saturable magnetic core having properties of flux remanence, at least a first current conductor magnetically coupled to the core to produce transient magnetic fluxes in the core upon the introduction of clock signals, at least a second current conductor magnetically coupled to the core for the induction of signals greater than a particular amplitude upon the formation of transient fluxes in the core, at least a third current conductor magnetically coupled to the core for producing a first level of residual magnetic flux in the core to provide for the formation of transient fluxes in the core and for producing a second level of residual magnetic flux in the core to inhibit the formation of transient fluxes in the core, means in the core for preventing the residual magnetic flux in the core from being permanently disturbed upon the introduction of the clock signals, means including a first pair of diodes coupled electrically to the second current conductor and responsive to the clock signals for receiving the clock signals and signals from the second current conductor to produce a first output signal upon each simultaneous occurrence of a clock signal and a signal greater than the particular amplitude from the current conductor, and means including a second pair of diodes coupled electrically to the second current conductor and responsive to the clock signals for receiving the clock signals and the signals from the second current conductor to produce a second output signal upon each occurrence of a clock signal without the simultaneous induction of a signal greater than the particular amplitude in the second current conductor.

12. In combination, a saturable magnetic core disposed to provide for the travel of the flux in a closed path of magnetic material, the core being provided with characteristics along a particular portion of the closed path to retain residual flux levels in the core even upon the production of transient magnetic fluxes in the core, means including at least a first winding magnetically coupled to the core to produce in the core a first magnetic level representing a state of magnetization inhibiting the production of additional magnetic flux in the core and to produce in the core a second magnetic level representing a state of magnetization providing for a production of additional magnetic flux in the core, means including a second winding magnetically coupled to the core at the particular portion of the core for periodically obtaining the production of transient magnetic fluxes in the core upon the occurrence of the third magnetic level in the core, and means including a second winding magnetically coupled to the core for producing output signals in accordance with the production of transient magnetic fluxes in the core.

13. In combination, a saturable magnetic core disposed in a closed loop of magnetic material and having properties of flux remanence, means including at least a first winding magnetically coupled to the core to produce in the core a first magnetic level representing a reduced state of magnetization in the core and to produce in the core a second magnetic level representing a saturating state of magnetization for the inhibition of the production of any transient magnetic flux in the core, there being a hole in the core, means including a second winding magnetically coupled to the core and extending through the hole in the core for providing for the introduction of clock signals to the winding to obtain the production of transient magnetic flux about the hole upon the occurrence of the reduced state of magnetization in the core, and a third winding magnetically coupled to the core and extending through the hole in the core for producing a first output signal upon the production of transient magnetic flux about the hole at the time of the introduction of the clock signals and for producing a second output signal upon a lack of production of transient magnetic flux about the hole at the time of introduction of the clock signals.

14. In combination, a saturable magnetic core having a closed configuration of magnetic material for the travel of flux and having properties of flux remanence, there being a hole disposed in the core in a particular configuration to maintain the continuity in the core, a first winding magnetically coupled to the core and extending through the hole in the core to receive clock signals for the production of transient magnetic fluxes in the core, means including a second winding magnetically coupled to the core for producing in the core a first magnetic level inhibiting the production of transient magnetic flux in the core by the first winding and for producing in the core a second magnetic level encouraging the production of transient magnetic flux in the core by the first winding, and a third winding magnetically coupled to the core for producing an output signal upon the production of the transient magnetic flux by the first winding means.

15. In the combination set forth in claim 14, the first winding extending through the hole in the core to produce transient magnetic flux about the hole upon the occurrence of the second magnetic level in the core and the third winding extending through the hole in the core to produce an output signal upon the production of the transient magnetic flux about the hole in the core.

16. In combination, a saturable magnetic core capable of retaining residual magnetic flux and provided with a continuous configuration of magnetic material, means including a first current conductor magnetically coupled to the core to produce transient magnetic fluxes in the core upon the introduction of clock signals, the core being formed to prevent the residual magnetic flux in the core from being permanently disturbed upon the introduction of the clock signals, means including a second current conductor magnetically coupled to the core for the induction of signals upon the formation of transient fluxes in the core, and means including at least a third current conductor magnetically coupled to the core for producing a first level of residual magnetic flux in the core to provide for the formation of transient fluxes in the core upon the introduction of the clock signals and for producing a second level of residual magnetic flux in the core to inhibit the formation of transient fluxes in the core upon the introduction of the clock signals.

17. In the combination set forth in claim 16, electrical circuitry coupled to the third current conductor to produce first output signals upon the induction of signals in the second current conductor at the time of introduction of the clock signals to the first current conductor and to produce second output signals upon a lack of induction of signals in the second current conductor at the time of introduction of the clock signals to the first current conductor.

18. In combination, a saturable core having properties of flux remanence and disposed in a closed loop of magnetic material, first means magnetically coupled to the core for producing a magnetic flux of saturating intensity in the core at first particular times and for producing a magnetic flux of reduced intensity in the core at other times, second means magnetically coupled to the core for receiving clock signals and for producing transient changes in the magnetic flux only during the times of reduced flux intensity in the core, the core being constructed to retain the magnetic flux of saturating intensity in the core and further to retain the magnetic flux of reduced intensity in the core even after the production of the transient magnetic flux in the core, and third means magnetically coupled to the core for producing signals in accordance with any transient changes in the flux in the core at the time of introduction of the clock signals.

19. The combination as set forth in claim 18 in which a hole is provided in the core and in which the second magnetically coupled means extends through the core to produce transient flux about the hole and in which the third magnetically coupled means extends through the hole in the core for the induction of signals in the third means upon the production of transient magnetic flux about the hole in the core.

20. The combination as set forth in claim 18 in which first electrical circuitry is electrically connected to the second and third magnetically coupled means to produce first output signals upon the induction of signals in the third magnetically coupled means at the time of introduction of the clock signals and in which second electrical circuitry is electrically connected to the second and third magnetically coupled means to produce second output signals upon a lack of induction of signals in the third magnetically coupled means at the time of introduction of the clock signals.

21. In combination, a saturable core having properties of retaining residual magnetic flux in the core and having a closed configuration of magnetic material for the flow of flux in a closed path of magnetic material, first winding means magnetically coupled to the core for producing magnetic flux in the core upon the occurrence of clock signals, second means magnetically coupled to the core to obtain an induction of signals greater than a particular amplitude in the second means upon the production of transient magnetic flux in the core by the clock signals, and third means magnetically coupled to the core for providing magnetic fluxes of a first intensity in the core to obtain the production of transient magnetic fluxes in the core upon the occurrence of the clock signals and for providing magnetic fluxes of a second intensity in the core to inhibit the production of transient magnetic fluxes in the core upon the occurrence of the clock signals, the core being constructed to provide a partial interrupton in its continuity for a division of the flux in the core at the positions of partial interruption and for the retention of the fluxes of first and second intensities in the core even during the introduction of the clock signals to the first winding means and for a return of these fluxes to the particular ones of the first and second intensities immediately after the introduction of the clock signals.

22. The combination as set forth in claim 21 in which the first magnetic means is magnetically coupled to the core at the position of partial interruption in the continuity of the core.

23. The combination as set forth in claim 22 in which electrical circuitry is electrically connected to the second magnetically coupled means and is responsive to the clock signals to produce first output signals upon the induction of signals greater than the particular amplitude in the second magnetically coupled means at the time of the clock signals and to produce second output signals upon the induction of signals less than the particular amplitude in the second magnetically coupled means at the time of the clock signals.

References Cited in the file of this patent

UNITED STATES PATENTS

| | | |
|---|---|---|
| 2,708,219 | Carver | May 10, 1955 |
| 2,733,424 | Chen | Jan. 31, 1956 |
| 2,741,757 | Devol et al. | Apr. 10, 1956 |
| 2,766,388 | Wulfing | Oct. 9, 1956 |
| 2,842,755 | Lamy | July 8, 1958 |

UNITED STATES PATENT OFFICE

CERTIFICATE OF CORRECTION

Patent No. 2,905,834 September 22, 1959

William R. Arsenault et al

It is hereby certified that error appears in the printed specification of the above numbered patent requiring correction and that the said Letters Patent should read as corrected below.

Column 10, line 33, claim 4, for "bore" read -- core --; column 12, line 13, claim 9, for "than a" read -- than the --.

Signed and sealed this 26th day of April 1960.

(SEAL)
Attest:

KARL H. AXLINE
Attesting Officer

ROBERT C. WATSON
Commissioner of Patents